United States Patent [19]
McCallister et al.

[11] Patent Number: 5,878,085
[45] Date of Patent: Mar. 2, 1999

[54] TRELLIS CODED MODULATION COMMUNICATIONS USING PILOT BITS TO RESOLVE PHASE AMBIGUITIES

[75] Inventors: Ronald D. McCallister, Scottsdale; Bruce A. Cochran, Mesa; John M. Liebetreu, Scottsdale, all of Ariz.

[73] Assignee: Sicom, Inc., Scottsdale, Ariz.

[21] Appl. No.: 912,155

[22] Filed: Aug. 15, 1997

[51] Int. Cl.$^6$ ................................. H04L 27/18
[52] U.S. Cl. ................ 375/280; 375/265; 375/308; 375/332; 375/341; 371/43.2; 371/43.4
[58] Field of Search .................. 375/259, 261, 375/262, 265, 271, 279, 280, 281, 283, 298, 302, 308, 322, 324, 329–332, 340, 341; 371/43.1, 43.2, 43.4, 43.6, 43.7

[56] References Cited

U.S. PATENT DOCUMENTS

| | | | |
|---|---|---|---|
| 4,462,101 | 7/1984 | Yasuda et al. | 371/43 |
| 5,233,629 | 8/1993 | Paik et al. | 375/39 |
| 5,233,630 | 8/1993 | Wolf | 375/67 |
| 5,396,518 | 3/1995 | How | 375/265 |
| 5,428,631 | 6/1995 | Zehavi | 371/43 |
| 5,469,452 | 11/1995 | Zehavi | 371/43 |
| 5,535,228 | 7/1996 | Dong et al. | 371/49.1 |
| 5,602,583 | 2/1997 | Citta | 348/21 |
| 5,633,881 | 5/1997 | Zehavi et al. | 371/37.5 |
| 5,757,856 | 5/1998 | Fang | 375/265 |

OTHER PUBLICATIONS

Viterbi et al. "A Pragmatic Approach to Trellis–Coded Modulation", IEEE Communications Magazine, Jul. 1989 pp. 11–19.
Wolf and Zehavi, "P$^2$ Codes: Pragmatic Trellis Codes Utilizing Punctured Convolution Codes", IEEE Communications Magazine, Feb. 1995 pp. 94–99.
D. Delaruelle, "A Pragmatic Coding Scheme for Transmission of 155 Mbit/s SDH and 140 Mbit/s PDH Signals Over 72 MHz Transponders", Proc. ICDSC–10, Brighton, May 1995.

G. David Forney, Jr and Edward K. Hower, "A High–Speed Sequential Decoder: Prototype Design and Test", IEEE Transactions on Communication Technology, Oct. 1971, vol. COM–19 No. 5 pp. 821–835.

M. Vanderaar et al., A Low Complexity Digital Encoder Modulator for High Data Rate Satellite BISDN Applications, IEEE 1996, pp. 357–33.

Pietrobon et al., "Trellis–Coded Multidimensional Phase Modulation," IEEE Transactions on Information Theory, Jan. 1990, vol. 36 No. 1.

Primary Examiner—Stephen Chin
Assistant Examiner—Jeffrey W. Gluck
Attorney, Agent, or Firm—Meschkow & Gresham, P.L.C.; Lowell W. Gresham; Jordan M. Meschkow

[57] ABSTRACT

A communication system (10) includes a rotationally invariant pragmatic trellis coded modulation (PTCM) encoder (18) and decoder (34). The PTCM encoder (18) partitions information bits (20) into primary (42) and secondary (44) data streams. A pilot bit (56) is inserted into the secondary data stream (44) during each frame (46). The secondary stream (44) then receives rate ½ convolutional encoding (60) that is punctured to a rate of 9/16. The primary data stream (42) is differentially encoded (50). The encoded primary and secondary streams are concurrently phase mapped (70) using an 8-PSK constellation so that an effective code rate of 5/6 results. The PTCM decoder (34) convolutionally decodes (84) the secondary stream, then re-encodes secondary stream estimates using a systematic, transparent convolutional encoder (88). The pilot bit is evaluated (92) in the re-encoded symbol estimates (90) to detect and correct any secondary stream inversion that may have occurred due to phase ambiguity. After this correction, the secondary modulation is removed (98) from phase value estimates, and the primary stream is decoded.

25 Claims, 5 Drawing Sheets

TRELLIS CODED MODULATION COMMUNICATIONS USING PILOT BITS TO RESOLVE PHASE AMBIGUITIES

TECHNICAL FIELD OF THE INVENTION

The present invention relates generally to the field of digital communications. More specifically, the present invention relates to encoders and decoders for pragmatic trellis coded modulation.

BACKGROUND OF THE INVENTION

Pragmatic trellis coded modulation (PTCM) has become popular because it allows a common basic encoder and decoder to achieve respectable coding gains for a wide range of bandwidth efficiencies (e.g. 1–6 b/s/Hz) and a wide range of coding applications, such as 8-PSK, 16-PSK, 16-QAM, 32-QAM, etc.

In general, PTCM employs primary and secondary modulation schemes. The words "primary" and "secondary" do not indicate relative importance. Rather, the secondary modulation is simply applied to a first subset of information bits, and the primary modulation is applied to the remaining information bits. Conventionally, the secondary modulation scheme differentially encodes its subset of information bits, then encodes these differentially encoded bits with a strong error detection and correction code, such as the well known K=7, rate ½ "Viterbi" convolutional code (i.e. Viterbi encoding). The primary modulation scheme need do no more than differentially encode its subset of the information bits. The resulting symbols from the primary and secondary modulation schemes are then concurrently phase mapped to generate quadrature components of a transmit signal. The symbol data are conveyed, at least in part, through the amplitude and phase relationships between the quadrature components of the transmit signal.

Carrier-coherent receiving schemes are often used with PTCM because they demonstrate improved performance over differentially coherent receiving schemes. Coherent receivers become phase synchronized to the received signal carrier in order to extract the amplitude and phase relationships indicated by the quadrature components. However, an ambiguity results because the receiver inherently has no knowledge of an absolute phase reference, such as zero. In other words, where one of $2^k$ possible phase states are conveyed during each unit interval, where $K^k$ equals the number of symbols conveyed per unit interval, then the receiver may identify any of the $2^k$ phase states as the zero phase state. This ambiguity must be resolved before the conveyed amplitude and phase data successfully reveal the information bits. Conventionally, the differential encoding, when used in connection with transparent convolutional codes applied to the secondary modulation, allows decoding circuits to resolve the phase ambiguity with respect to the secondary modulation. When the secondary modulation is decoded, these decoded bits are then used to re-generate the secondary modulation for use in decoding the primary modulation. The ambiguity must be resolved to correctly re-generate the secondary modulation so that the primary modulation can then be decoded.

Unfortunately, such schemes have conventionally been rotationally variant, particularly for higher orders of modulation. In other words, the decoders cannot remain locked regardless of which phase reference point is originally selected. As a result, when the decoder locks at some phase states, the differential decoding on the secondary modulation allows the decoder to quickly begin decoding data. However, when the decoder locks at other phase states, an extensive and time consuming normalization rate detection process is performed to regain lock.

The difficulty in achieving rotational invariance is believed to be caused, at least in part, by choosing a scheme for mapping symbols generated by convolutional encoders to phase points which excessively commingles primary and secondary modulation symbols in the resulting phase constellation. It may result in part from using a Gray code for mapping symbols generated by convolutional encoders to phase points and in part from attempting to convey more than one convolutionally encoded symbol from a given secondary information bit stream per unit interval.

In addition, the use of differential encoding upon the convolutionally encoded secondary information bit stream is undesirable because when a single error occurs, two highly correlated errors are observed in the decoder. Consequently, a significant degradation of error probabilities results.

Another technique known in connection with digital communication schemes, including PTCM, is puncturing. When signal-to-noise ratios in a communication channel permit, the convolutional coding may be punctured to improve the effective coding rate at the cost of reduced coding gain. Conventional systems which use punctured coding attempt to achieve a coding rate as close to one as is possible to maximize the data transfer rate and justify the complexity of including a puncturing and depuncturing system. While puncturing is desirable in many applications, the significant reduction in coding gain which results from the conventional practice of achieving a coding rate as close to one as possible is highly undesirable for the convolutional encoding applied to the secondary information bits of PTCM. The secondary modulation of PTCM requires strong coding because the secondary information bit stream is used to decode the primary bit stream. Single errors in this bit stream lead to many other errors, and significant weakening of this coding results in a significant degradation of error probabilities.

SUMMARY OF THE INVENTION

Accordingly, it is an advantage of the present invention that an improved system and method for communicating digital data while resolving phase ambiguities is provided.

Another advantage of the present invention is that an encoder and decoder are provided which are rotationally invariant.

Another advantage of the present invention is that an encoder and decoder are provided which implement a pragmatic trellis coded modulation scheme without differentially encoding the secondary modulation.

Another advantage of the present invention is that an encoder and decoder are provided which operate at a variety of effective code rates while remaining rotationally invariant.

The above and other advantages of the present invention are carried out in one form by an apparatus for encoding information bits to be communicated so that phase ambiguities are resolvable. The encoding apparatus includes a differential encoder that produces a first encoded stream in response to a first stream portion of the information bits. A pilot bit generator produces an augmented second stream in response to a second stream portion of the information bits. The augmented second stream includes a pilot bit of predetermined polarity periodically inserted into the second stream portion of the information bits. A convolutional encoder produces a second encoded stream in response to the augmented second stream, and a phase mapper then generates phase point data in response to the first and second encoded streams.

The above and other advantages of the present invention are carried out in another form by an apparatus for decoding information bits from a digital communication signal and resolving phase ambiguities. The decoding apparatus includes a phase estimator that generates a stream of phase values in response to the digital communication signal. A convolutional decoder then decodes the stream of phase values to generate a second data stream. This second data stream includes a portion of the information bits and a periodically occurring pilot bit. A controller identifies occurrences of the periodically occurring pilot bit in the second data stream, A phase rotator generates an adjusted phase value stream by selectively rotating the stream of phase values in response to the periodically occurring pilot bit and the portion of the information bits. A differential decoder differentially decodes the adjusted phase value stream into a first data stream. The first data stream and the portion of the information bits together provide the information bits.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
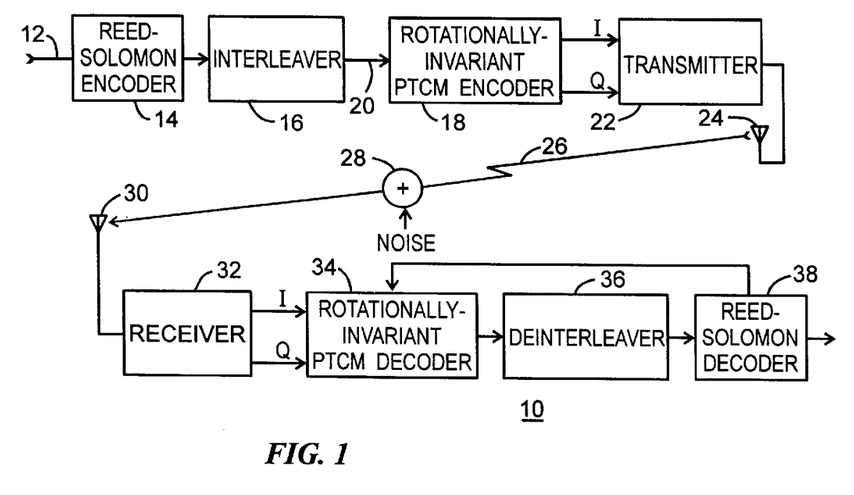
FIG. 1 shows a block diagram of a digital communication system configured in accordance with the teaching of the present invention.

FIG. 1 shows a block diagram of a digital communication system 10 configured in accordance with the teaching of the present invention. At a supply point 12, system 10 receives information bits or user data to be transmitted. In one embodiment of the present invention, concatenated coding is implemented. Accordingly, in this embodiment supply point 12 couples to an input of a Reed-Solomon or other block encoder 14. An output of Reed-Solomon encoder 14 couples to an input of an interleaver 16, and an output of interleaver 16 couples to an input of a rotationally invariant pragmatic trellis coded modulation (PTCM) encoder 18. In another embodiment of the present invention, concatenated coding is omitted, and information bits are applied directly to PTCM encoder 18. For convenience, the data supplied to PTCM encoder 18 are referred to herein as information bits 20 regardless of whether concatenated coding is implemented. PTCM encoder 18 is discussed in more detail below in connection with FIGS. 2–3.

PTCM encoder 18 generates phase point data that may be in the form of I and Q quadrature signals which are supplied to a transmitter 22. Transmitter 22 couples to an antenna 24 from which a digital communication signal 26 is broadcast through a communication channel 28. As illustrated in FIG. 1, digital communication signal 26 is invariably corrupted to some degree by noise within channel 28. This noise-corrupted digital communication signal 26 is received at an antenna 30 which couples to an input of a receiver 32. In the preferred embodiments, receiver 32 implements a carrier-coherent reception scheme. Receiver 32 produces rectilinear (i.e., I and Q) or polar (i.e., $\phi$ and M, not shown) quadrature components which are then supplied to a rotationally invariant PTCM decoder 34. PTCM decoder 34 is discussed in more detail below in connection with FIGS. 4–6.

PTCM decoder 34 generates estimates of original information bits 20. In one embodiment of the present invention an output of PTCM decoder 34 couples to an input of a deinterleaver 36, an output of which couples to an input of a Reed-Solomon or other block decoder 38. In another embodiment, deinterleaver 36 and Reed-Solomon decoder 38 are omitted. When Reed-Solomon decoder 38 is included, an output which indicates when valid data are being received is fed back to PTCM decoder 34 to aid in achieving node synchronization (i.e. to determine frame timing). However, if Reed-Solomon decoder 38 is omitted, then other node synchronization techniques known to those skilled in the art may be used to identify frame timing.

Figure 2:
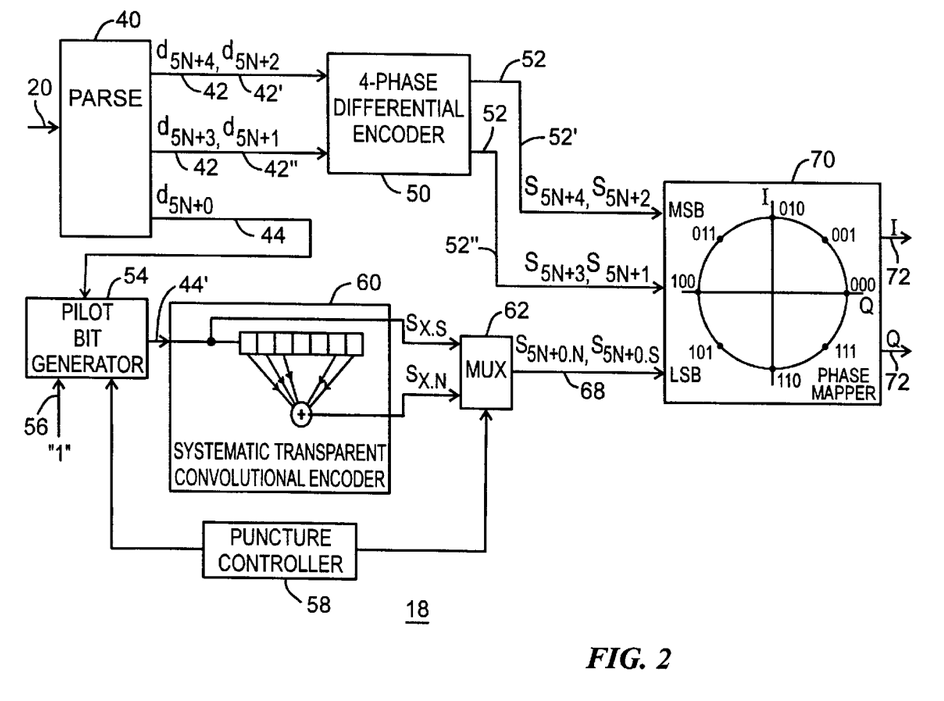
FIG. 2 shows a block diagram of a rotationally invariant pragmatic trellis coded modulation (PTCM) encoder portion of the digital communication system.
Figure 3:
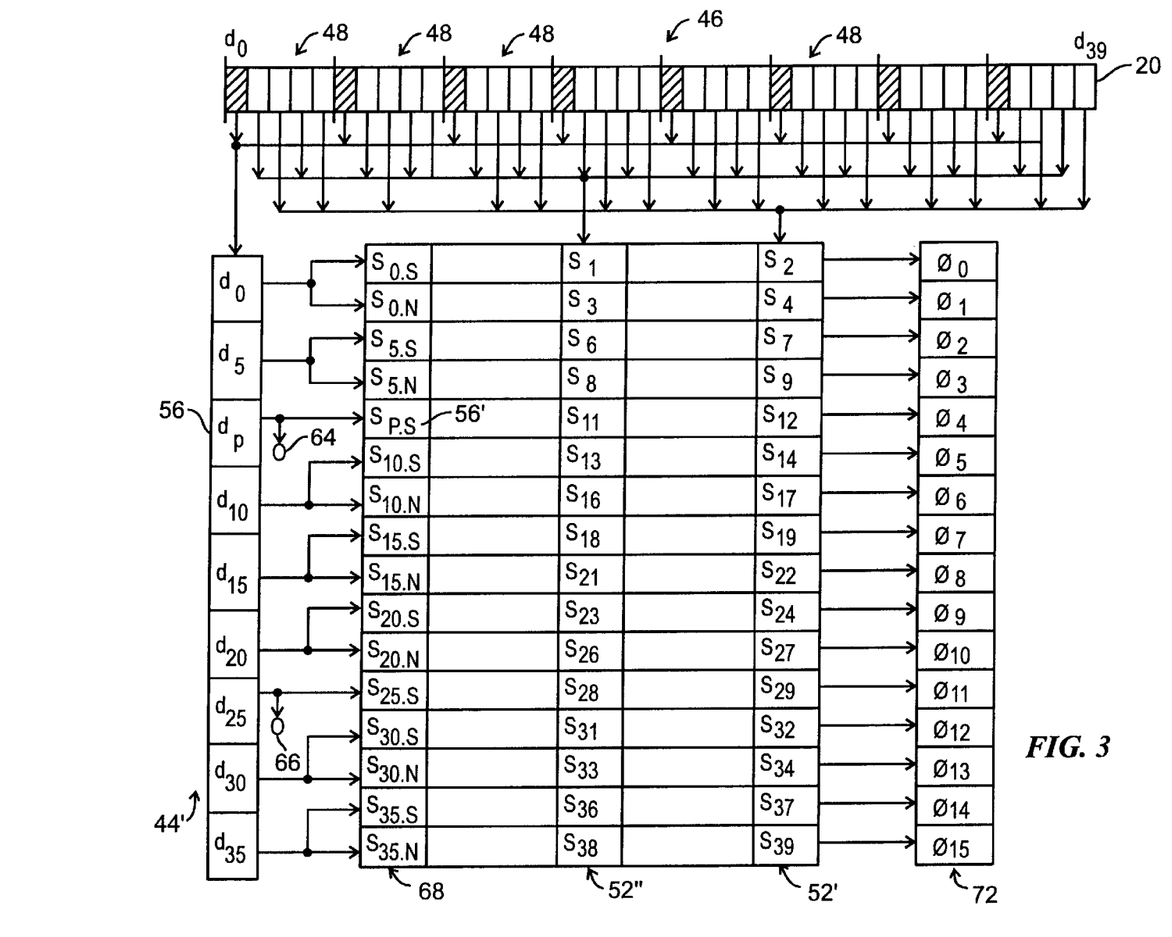
FIG. 3 shows a data flow diagram depicting the flow of certain data within the PTCM encoder.

FIG. 2 shows a block diagram of rotationally invariant PTCM encoder 18, and FIG. 3 shows a data flow diagram depicting the flow of certain data within PTCM encoder 18. Referring to FIGS. 2 and 3, a stream of information bits 20 is supplied to an input of a parsing block 40. Parsing block 40 partitions information bit stream 20 into a primary stream portion 42 and a secondary stream portion 44. PTCM encoder 18 applies secondary modulation to secondary stream 44 and primary modulation to primary stream 42.

The present invention may be adapted to operate over a wide variety of modulation formats and orders and to produce a wide variety of effective code rates. However, for the sake of clarity the below presented discussion focuses on an exemplary implementation which adapts the present invention to an 8-PSK modulation format and order to achieve an effective code rate of ⅚. Those skilled in the art will appreciate that the present invention is not limited to 8-PSK or an effective code rate of ⅚ and may be applied to different formats and orders, including 16-PSK, 16-QAM, 32-QAM, etc., and with different effective code rates, such as ⅔, ⅞, etc.

Accordingly, for the exemplary implementation discussed herein, information bit stream 20 is temporally configured into frames 46 of forty bits each. FIG. 3 shows a single frame 46 of information bit stream 20. FIG. 2 depicts primary stream 42 as being further partitioned into sub-streams 42' and 42". For the exemplary embodiment, information bits 20 are grouped into five-bit groups, referred to herein as "pent-tuples" 48. Parsing block 40 sends the zero-th data bit of each pent-tuple (i.e. $d_{5N+0}$) into secondary stream 44. The letter "N" refers to the "$N^{th}$" pent-tuple 48 within each frame 46, where N is an integer in the range of zero through seven. FIG. 3, illustrates this zero-th bit of each pent-tuple 48 with a shaded block. The first and third data bits of each pent-tuple (i.e. $d_{5N+1}$ and $d_{5N+3}$) are sent to primary sub-stream 42", and the second and fourth data bits of each pent-tuple (i.e. $d_{5N+2}$ and $d_{5N+4}$) are sent to primary sub-stream 42'.

Primary streams 42' and 42" are supplied to inputs of a 4-phase differential encoder 50. Differential encoder 50 produces a primary encoded stream 52, which includes primary encoded sub-streams 52' and 52" to correspond to primary sub-streams 42' and 42", respectively.

A unit interval of time is required by system 10 (see FIG. 1) to communicate a single set of phase data. This unit interval represents the reciprocal of the baud rate. Over each unit interval, the relative phase of quadrature components of digital communication signal 26 (see FIG. 1) transitions from one set of phase data to another.

During each unit interval, differential encoder 50 processes two information bits and produces two symbols. During one unit interval, symbols $S_{5N+1}$ and $S_{5N+2}$ result from processing the first and second information bits $d_{5N+1}$ and $d_{5N+2}$ of each pent-tuple 48. During the next unit interval, symbols $S_{5N+3}$ and $S_{5N+4}$ result from processing the third and fourth information bits $d_{5N+3}$ and $d_{5N+4}$ from each pent-tuple 48. The process repeats for subsequent pent-tuples 48.

Secondary stream 44 is supplied to a pilot bit generator 54. Pilot bit generator 54 produces an augmented secondary stream 44'. Augmented secondary stream 44' is formed from secondary stream 44 by periodically inserting into secondary stream 44 a pilot bit 56 ($d_p$) exhibiting a predetermined polarity. One pilot bit 56 is inserted during each frame 46. FIG. 3 illustrates pilot bit 56 as being inserted between bits $d_5$ and $d_{10}$ of secondary stream 44. The preferred embodiment causes pilot bit 56 to consistently have a logical one polarity, but this is an arbitrary choice. A consistently logical zero polarity or a known pattern also allows pilot bit 56 to exhibit a predetermined polarity. A puncture controller 58 provides an output that couples to pilot bit generator 54 and informs pilot bit generator 54 when to insert pilot bit 56.

An output of pilot bit generator 54 couples to an input of an encoder 60. In the preferred embodiment, encoder 60 implements a modified, recursive, K=7, rate ½ convolutional ("Viterbi") encoder. In particular, encoder 60 implements a systematic and transparent code. Since encoder 60 implements a rate ½ code, two symbols are produced for each bit received from augmented secondary stream 44'. However, encoders which implement rates less than ½ may be substituted.

Since encoder 60 implements a systematic code, one of these two symbols has a direct relationship, such as equal to or a complement of, the input bit. In other words, the "systematic" output symbol is not responsive to past data from augmented secondary stream 44'. Systematic symbols are denoted with a "$_{.s}$" subscript suffix herein. A "non-systematic" symbol is responsive to past data from augmented secondary stream 44'. Since the non-systematic symbol is responsive to past data, it does not have a direct relationship to the information bit for which it is produced. Rather, it has a complex relationship defined by the convolutional code along with past and present information bits. Non-systematic symbols are denoted with a "$_{.N}$" subscript suffix herein.

Since encoder 60 implements a transparent code, a linear relationship exists between the two outputs of encoder 60. In other words, if identical data streams except for one complemented bit are presented to encoder 60, then encoder 60 will produce corresponding symbol pairs for the data streams in which either both symbols are inverted or neither symbol is inverted. Encoder 60 implements a systematic, transparent code because it implements an identical code to that implemented in a convolutional encoder included in PTCM decoder 34 (FIG. 1). That convolutional encoder is discussed below.

Systematic and non-systematic outputs of encoder 60 provide systematic symbols $S_{X.S}$ and non-systematic symbols $S_{X.N}$, respectively, to a multiplexer (MUX) 62, where "X" is an integer number. Puncture controller 58 also couples to MUX 62 to indicate when to puncture the symbol stream produced by encoder 60. Puncturing refers to the occasional discarding of a symbol from a symbol stream. Symbols may be discarded when a communication channel provides a sufficiently high signal-to-noise ratio that the coding gain provided by encoder 60 is greater than required. Thus, puncturing increases the effective coding rate, at a cost of reducing coding gain.

In the preferred embodiment, puncturing is not performed to increase effective coding rate. Rather, puncturing is performed to maintain an effective coding rate while transmitting the periodically inserted pilot bit 56 in addition to information bits 20. Accordingly, puncturing is performed so that the convolutional coding rate for encoder 60 is raised only slightly. Desirably, the ½ coding rate of encoder 60 is raised to a punctured coding rate of <⅔. In the exemplary embodiment described herein, a punctured coding rate of 9/16 is achieved by puncturing or erasing two symbols per frame 46. This slight increase in coding rate has little influence on the coding gain. Accordingly, only an insignificant performance penalty results from transmitting pilot bit 56 and using a slightly punctured pragmatic trellis code.

Puncture controller 58 is configured so that erasures do not include pilot bit 56. Thus, at least a systematic symbol 56' ($S_{P.S}$) is produced when encoder 60 receives pilot bit 56 ($d_P$). Moreover, puncture controller 58 is, desirably configured so that an erasure occurs to the non-systematic symbol for pilot bit 56 ($d_P$), as indicated at a discard 64 in FIG. 3. As discussed in more detail below, pilot bit 56 is used to identify the ambiguous rotational state of PTCM decoder 34 (FIG. 1). Consequently, an error in pilot bit 56 may have a more degrading influence on error probabilities than in other bits in secondary stream 44. By refraining from puncturing pilot bit 56, the risks of observing errors in pilot bit 56 are held as low as possible. On the other hand, the non-systematic symbol for pilot bit 56 conveys no user data information. Consequently, it is desirably punctured to hold the risk of observing errors in information bits 20 as low as possible. In the exemplary embodiment being described herein, a second non-systematic bit is punctured for each frame 46, as indicated at a discard 66. This second bit is desirably displaced from the first punctured bit within frame 46 by a distance greater than the length of encoder 60.

Accordingly, MUX 62 produces a secondary encoded stream 68 which includes non-systematic and systematic symbols generated from the zero-th information bit of each pent-tuple 48 (i.e. $S_{5N+0.N}$ and $S_{5N+0.S}$). Outputs from differential encoder 50 and from MUX 62 couple to inputs of a phase mapper 70. Phase mapper 70 is configured to concurrently map a symbol from primary encoded sub-stream 52' with a symbol from primary encoded sub-stream 52" and a symbol from secondary encoded stream 68. One mapping occurs for each unit interval. Each mapping causes a phase point datum 72 to be produced. Each phase point datum 72 is characterized by quadrature components which exhibit a predetermined relative phase. In a QAM implementation, each datum is further characterized by the magnitude of the resulting phase point datum 72.

An integer "K" equals the number of symbols being mapped and transmitted per unit interval. For the 8-PSK example depicted in FIG. 2, K equals three, and phase mapper 70 produces one of $2^K$ possible phase points 72 for each unit interval. FIG. 2 illustrates a desired phase map between input symbols and phase point data 72. In particular, phase mapper 70 implements a binary code rather than the traditional Gray code. A binary code is characterized by the phase increasing at an increment of $2\pi/2^K$ as the input code increases by one. In other words, as phase point data 72 rotates, the least significant bit (LSB) of the input code alternates between zero and one for all adjacent phase points 72. Furthermore, pairs of adjacent phase points 72 have their two most significant bits (MSBs) in common.

Due to pilot bit insertion and puncturing, MUX 62 generates two symbols for each pent-tuple 48 in the exemplary embodiment described here. MUX 62 is configured so that only one of the two symbols it produces for each pent-tuple 48 is mapped per unit interval. Moreover, secondary encoded stream 68 is exclusively coupled to only one bit of phase mapper 70, and that one bit is the LSB in this embodiment. Consequently, secondary encoded stream 68 and only secondary encoded stream 68 drives the LSB of phase mapper 70. As a result, all secondary encoded stream symbols of a first polarity (e.g., a logical one) are mapped to a phase point 72 of $(2n+1)(2\pi/2^K)$, and all symbols of a second polarity (e.g., a logical zero) are mapped to a phase point 72 of $(2n)(2\pi/2^K)$, where n is an integer in the range of zero through $2^{K-1}-1$.

If carrier synchronization in receiver 32 (FIG. 1) causes a rotational inaccuracy of $(2n)(2\pi/2^K)$, then the resulting phase nevertheless continues to indicate the correct data for the secondary stream, regardless of the value of n. If a rotational inaccuracy of $(2n+1)(2\pi/2^K)$ occurs in receiver 32, then the resulting phase consistently indicates complemented data for the secondary stream, regardless of the value of n. Accordingly, PTCM decoder 34 (FIG. 1) uses pilot bit 56 to determine whether the secondary stream appears to be complemented, uses this determination to decode the secondary stream, then removes the secondary stream modulation to leave only primary modulation, which is QPSK in this exemplary embodiment. By removing the secondary stream modulation, the coding gain of the secondary modulation is extended to the primary modulation. Rotational ambiguity in the primary stream is easily resolved through the use of differential encoding. Accordingly, the primary stream receives the benefit of a strong convolutional code and uses differential encoding to resolve phase ambiguity. The secondary stream receives the benefit of a strong convolutional code and uses a pilot bit to resolve phase ambiguity. A rotational invariant coding scheme results.

Figure 4:
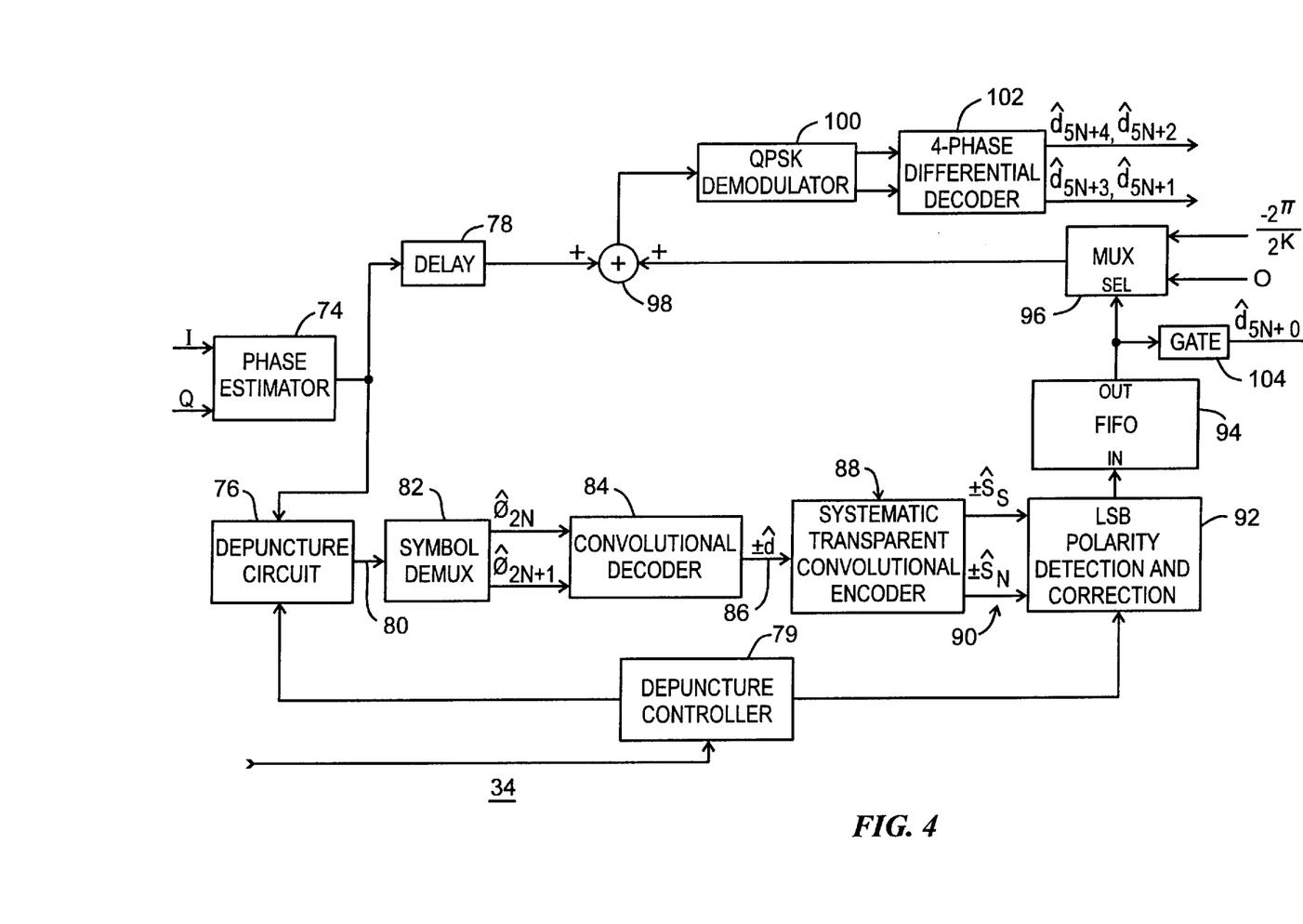
FIG. 4 shows a block diagram of a rotationally invariant PTCM decoder portion of the digital communication system.
Figure 5:
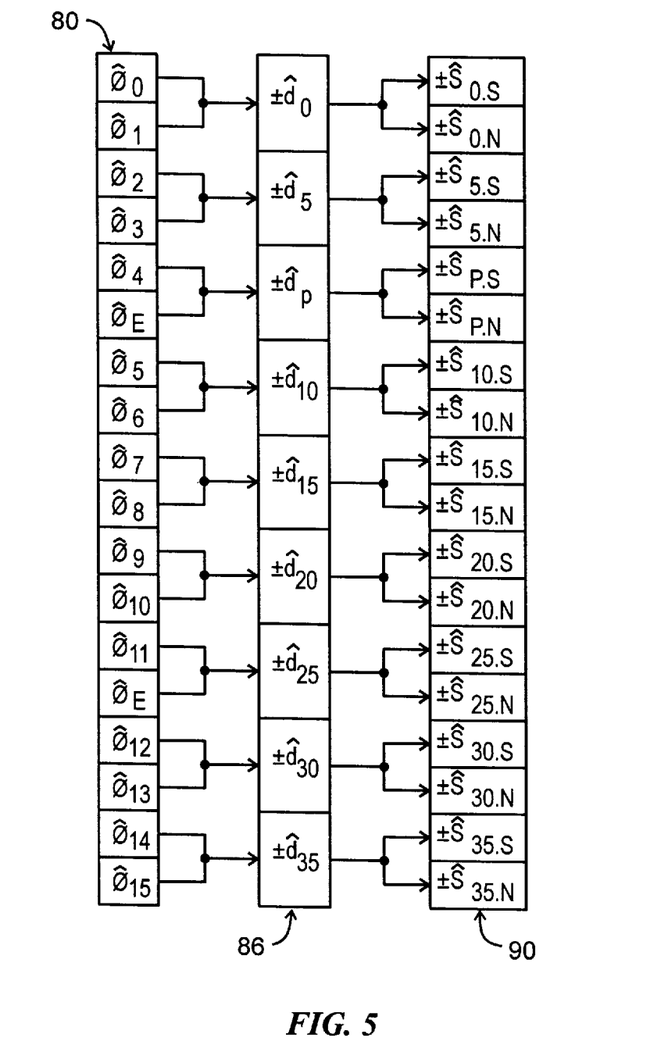
FIG. 5 shows a data flow diagram depicting the flow of certain data within the PTCM decoder.

FIG. 4 shows a block diagram of PTCM decoder 34, and FIG. 5 shows a data flow diagram depicting the flow of certain data within PTCM decoder 34. Referring to FIGS. 4 and 5, quadrature signal components from receiver 32 (FIG. 1) are supplied to a phase estimator 74. Phase estimator 74 estimates the phase indicated by the quadrature components. An estimated phase value is provided for each unit interval, and a stream of estimated phase values results. The estimated phase values are determined to a degree of precision that includes soft decision bits. For example, even though only three symbols are conveyed per unit interval in the exemplary embodiment discussed herein, phase estimator 74 may characterize estimated phase values to a precision of 5–10 bits per phase value.

The estimated phase values are supplied to a depuncture circuit 76 and to a delay block 78. Depuncture circuit 76 and delay block 78 may, but need not, receive the same sets of bits produced for each estimated phase value. For example, depuncture circuit 76 may receive bits of lesser significance while delay block 78 receives bits of greater significance, with considerable overlap between the two sets.

Depuncture circuit 76 periodically inserts erasure values into the estimated phase value stream. Erasure values are dummy phase values that desirably indicate a phase intermediate to adjacent phase points 72 (FIG. 2). Desirably, one erasure value is inserted to compensate for each puncture in secondary encoded stream 68 (FIGS. 2–3). Since one puncture occurred adjacent to pilot bit 56 (FIG. 3), one erasure value is inserted adjacent to the estimated phase value $\hat{\phi}_4$ which directly corresponds to pilot bit 56. Since another puncture occurred immediately after phase point 72 for $\hat{\phi}_{11}$ (FIG. 3) in conjunction with information bit $d_{25}$, another erasure value is inserted following estimated phase value $\hat{\phi}_{11}$.

Depuncture circuit 76 identifies the locations for erasure value insertion through timing signals received from a depuncture controller 79. Depuncture controller 79 works with Reed-Solomon decoder 38 (FIG. 1) to identify the timing locations of pilot bit 56 and the locations for erasure insertions. For example, upon initiation, depuncture controller 79 may cycle through successive possible pilot bit 56 locations while dwelling sufficiently long to monitor a valid output from Reed-Solomon decoder 38. When Reed-Solomon decoder 38 indicates valid data, the timing locations of pilot bit 56 have been determined. A depunctured stream of estimated phase values 80 is provided by depuncture circuit 76.

An output of depuncture circuit 76 provides a depunctured stream of estimated phase values 80 to a symbol demultiplexer (DEMUX) 82. Symbol DEMUX 82 groups pairs of estimated phase values to present to a convolutional ("Viterbi") decoder 84. Each pair of estimated phase values includes systematic and non-systematic symbols produced in response to a single information bit. FIG. 4 denotes such pairs as including estimated phase values $\hat{\phi}_{2N}$ and $\hat{\phi}_{2N+1}$. Convolutional decoder 84 performs a complementary operation to that performed by convolutional encoder 60 (FIG. 2). Accordingly, convolutional decoder 84 produces one information bit estimate $\pm\hat{d}$ for each pair of phase value estimates $\hat{\phi}_{2N}$ and $\hat{\phi}_{2N+1}$. Those skilled in the art will appreciate that convolutional decoder 84 may process each pair of estimated phase values for numerous unit intervals before generating a data estimate. The output from decoder 84 represents an estimate of augmented secondary stream 44' (FIGS. 2–3). In other words, decoder 84 provides an estimate 86 of secondary data stream 44 with pilot bit 56 periodically inserted therein. As discussed above, receiver 32 (FIG. 1) may arbitrarily lock at a phase which causes a complement of the secondary data stream to be observed at PTCM decoder 34. Accordingly, estimate 86 of secondary data stream 44 may be either of a correct polarity or inverted. For that reason, FIG. 5 denotes estimate 86 as being "±".

An output of convolutional decoder 84 provides its estimate 86 of augmented secondary stream 44' to a systematic, transparent convolutional encoder 88. Convolutional encoder 88 is desirably identical to convolutional encoder 60 of PTCM encoder 18 (FIG. 2). Accordingly, if estimates of augmented secondary stream 44' are correct, then a re-encoded data stream 90 produced by convolutional encoder 88 includes symbol estimates $\pm\hat{S}_S$ and $\pm\hat{S}_N$ which equal corresponding symbols produced by convolutional encoder 60 in PTCM encoder 18, except for the inclusion of punctured symbols.

Convolutional encoder 88 implements a systematic and transparent code because this type of code provides polarity correspondence across convolutional encoder 88. Thus, if the secondary stream is inverted due to an arbitrary rotational lock point of receiver 32 (FIG. 1), systematic and non-systematic symbol estimates output from convolutional encoder 88 are inverted. Once the inversion is detected, the effects of this inversion on the systematic and non-systematic symbol estimates are easily determined.

The symbol estimates from re-encoded data stream 90 are used to selectively rotate the estimated phase values from the estimated phase value stream. Rotation is in an amount of either zero or $-2\pi/2^K$, where K is equal to the number of symbols transmitted per unit interval. Whether rotation is to be applied or not for each unit interval is determined in response to a current inversion state declared for PTCM decoder 34 by an LSB polarity detection and correction circuit 92 and in response to the polarity of the estimated secondary stream symbol $\hat{S}_{X.S}$ or $\hat{S}_{X.S}$ from stream 90 for that unit interval.

Accordingly, re-encoded data stream 90 from convolutional encoder 88 is supplied to LSB polarity detection and correction circuit 92 as is a timing signal from depuncture controller 79. This timing signal indicates when symbol estimates for pilot bits are being received at circuit 92. Circuit 92 is discussed in more detail below in connection with FIG. 6.

Circuit 92 essentially detects and corrects any polarity inversion which may or may not be observed in the secondary symbol stream. The resulting correct-polarity estimated secondary symbol stream is entered into a first in, first out (FIFO) memory 94 which serves as a rate converter.

This correct-polarity stream is extracted from FIFO 94 at the appropriate timing for application through a multiplexer (MUX) 96 to a summation circuit 98. The estimated secondary symbol stream information bits from FIFO 94 control a selection input of MUX 96. This selection input selects a constant phase value of either zero or $-2\pi/2^K$ for application to summation circuit 98. Summation circuit 98 also receives the estimated phase values from phase estimator 74 delayed through delay block 78. Delay block 78 delays estimated phase values by a sufficient duration to achieve coincidence between symbols of the primary and secondary streams. Coincidence is achieved when a secondary symbol estimate from FIFO 94 is output at the same instant a phase value which conveyed the secondary symbol estimate is output from delay block 78.

Summation circuit 98 removes the secondary modulation from the phase value, leaving the primary modulation. In the exemplary embodiment, the primary modulation is QPSK. Accordingly, an output of summation circuit 98 provides an adjusted estimated QPSK phase value stream to an input of a QPSK demodulator 100. QPSK demodulator 100 estimates the polarity of the two primary encoded sub-stream 52' and 52" symbols (FIGS. 2–3), for each unit interval. The two primary sub-stream symbol estimates for each unit interval are provided to a 4-phase differential decoder 102. Decoder 102 converts the two symbol estimates into estimates of the corresponding primary sub-stream 42' and 42" (FIG. 2) information bits. An arbitrary $\pi/2$ phase lock of receiver 32 is compensated by decoder 102. An arbitrary $\pi/4$ (i.e., $2\pi/2^K$, where K=3) phase lock of receiver 32 has already been compensated for through the removal of secondary modulation.

Estimates of the corresponding secondary information bits 44 (FIG. 2) are provided by a gating circuit 104, which has an input coupled to the output of FIFO 94. Gating circuit 104 delays the systematic symbol outputs from FIFO 94 so that they are output coincidental with corresponding information bits estimates from decoder 102. The systematic symbol outputs equal data estimates. Accordingly, for each pent-tuple 48 (FIG. 3), PTCM decoder 34 provides estimates of the zero-th information bits $\hat{d}_{5N+0}$ from gating circuit 104, estimates for the first and third information bits $\hat{d}_{5N+1}$ and $\hat{d}_{5N+3}$ from decoder 102, and estimates for the second and fourth information bits $\hat{d}_{5N+2}$ and $\hat{d}_{5N+4}$ from decoder 102.

Figure 6:
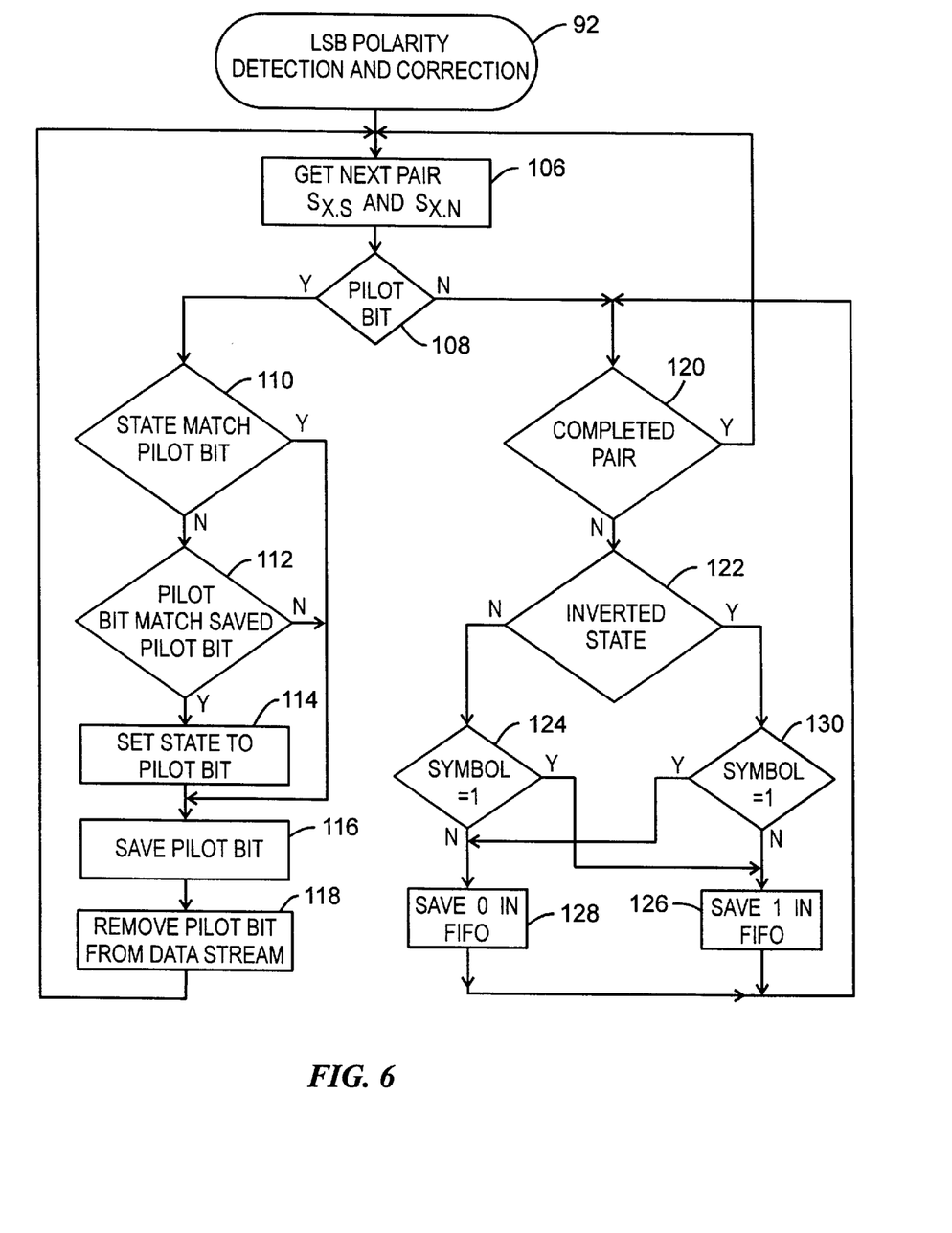
FIG. 6 shows a flow chart which depicts logic implemented in a LSB polarity detection and correction block of the PTCM decoder.

FIG. 6 shows a flow chart which depicts logic implemented in LSB polarity detection and correction circuit 92. Referring to FIGS. 5 and 6, at a task 106, circuit 92 gets the next pair of symbol estimates $\hat{S}_{X.S}$ and $\hat{S}_{X.N}$ from re-encoded data stream 90. Next, at a query task 108, the input from depuncture controller 79 (FIG. 4) is tested to determine whether the pair of symbol estimates convey pilot bit 56 (FIGS. 2–3). In other words, task 108 determines whether the pair of symbol estimates are $\hat{S}_{P.S}$ and $\hat{S}_{P.N}$.

When symbol estimates $\hat{S}_{P.S}$ and $\hat{S}_{P.N}$ have been obtained, a query task 110 determines whether the inversion state declared for PTCM decoder 34 (FIGS. 1 and 4) matches the pilot bit, as determined from $\hat{S}_{P.S}$. Since convolutional encoder 88 (FIG. 4) implements a systematic code, $\hat{S}_{P.S}$ directly corresponds to the estimate of the pilot bit. Since the pilot bit exhibits a predetermined polarity, circuit 92 has a priori knowledge of its polarity. Accordingly, $\hat{S}_{P.S}$ provides an indication of whether the secondary stream is inverted.

If $\hat{S}_{P.S}$ indicates an inversion state that does not match that already declared for PTCM decoder 34, a query task 112 determines whether the pilot bit, as determined from $\hat{S}_{P.S}$, matches a saved pilot bit. The saved pilot bit represents the pilot bit estimate from the previous frame 46 (FIG. 3). If a match is found, then two successive frames 46 have occurred for which the pilot bit estimate does not match the inversion state declared for PTCM decoder 34. A high likelihood exists at this point that the declared inversion state for PTCM decoder 34 is not correct. Accordingly, a task 114 is performed to set the inversion state to a value corresponding to the estimated pilot bit, thereby declaring a new inversion state for PTCM decoder 34.

After task 114, a task 116 is performed. Task 116 saves the pilot bit estimate for possible evaluation in the next frame 46 when the next pilot bit estimate is received. When task 110 determines that the pilot bit estimate matches the declared inversion state, the declared inversion state is probably correct. Thus, no changes in declared inversion state occur, and task 116 is also performed in this situation. When task 112 determines that the estimated pilot bit does not match the saved pilot bit estimate from the previous frame, a reliable determination concerning the correctness of the declared inversion state cannot be made. Consequently, no changes to declared inversion state occur and task 116 is also performed in this situation.

After task 116, a task 118 removes the pilot bit estimate from re-encoded data stream 90, and process flow returns to task 106. The pilot bit estimate may be removed from re-encoded data stream 90 simply by refraining from writing either symbol estimate $\hat{S}_{P.S}$ or $\hat{S}_{P.N}$ to FIFO 94 (FIG. 4).

When task 108 determines that the pair of symbol estimates obtained in task 106 are not for the pilot bit, then the symbol estimates $\hat{S}_{X.S}$ and $\hat{S}_{X.N}$ convey an estimate of secondary stream user information. In this situation, a query task 120 determines whether both members of the pair of symbol estimates have been evaluated in tasks that are discussed below. When both members of the pair have been evaluated, process flow loops back to task 106 to get the next pair of symbol estimates.

When both members of the pair have not yet been evaluated, a query task 122 selects a pair member that has not yet been evaluated and determines whether the declared inversion state for PTCM decoder 34 is the inverted state. If the inverted state has not been declared, then the declared state is the non-inverted state and a query task 124 determines whether the selected symbol estimate exhibits a logical one polarity. If the non-inverted state has been declared and the selected symbol estimate exhibits a logical one polarity, then a task 126 is performed to save a logical one in FIFO 94 (FIG. 4). If the non-inverted state has been declared and the selected symbol estimate exhibits a logical zero polarity, then a task 128 is performed to save a logical zero in FIFO 94.

Returning to task 122, if the inverted state has been declared, then process flow is routed to a query task 130 which determines whether the selected symbol estimate exhibits a logical one polarity. If the inverted state has been declared and the selected symbol estimate exhibits a logical one polarity, then task 128 is performed to save a logical zero in FIFO 94. If the inverted state has been declared and the selected symbol estimate exhibits a logical zero polarity, then task 126 is performed to save a logical one in FIFO 94. Following tasks 126 or 128, process flow loops back to task 120 to either process the remaining member of the symbol estimate pair or to get the next symbol estimate pair.

Accordingly, by the operation of circuit 92 symbol estimates for the pilot bit are removed from the re-encoded data stream, and an inversion of the secondary data stream that may have occurred when receiver 32 (FIG. 1) was locked to an arbitrary phase state is corrected. This corrected symbol estimate stream that has been purged of pilot bits is extracted from FIFO 94 at the appropriate time so that it is used to remove the secondary modulation from the phase value stream, as discussed above.

An alternate embodiment to that described above may, but is not required to, use non-systematic encoders in place of encoder 60 (FIG. 2) and encoder 88 (FIG. 4). In this alternate embodiment, LSB polarity detection and correction block 92 and FIFO block 94 immediately follow convolutional decoder 84 (FIG. 4). Encoder 18 operates as discussed above. In decoder 34, LSB polarity detection and correction block 92 decides whether the pilot bits are inverted and corrects any polarity inversion in a manner similar to that described above in connection with FIG. 6. The corrected data estimates may then be rate-converted through FIFO 94 and presented to the encoder 88 to generate symbol estimates which control the rotation of phase rotator 98 (FIG. 4) to remove the secondary modulation from the phase value stream.

The exemplary embodiment discussed herein is desirable because it implements a rate ⅚ PTCM communication system using secondary modulation that has an effective coding rate of 9/16. Referring to FIGS. 2 and 3, forty information bits 20 are transmitted per frame 46. These forty information bits are transmitted using forty eight symbols. Since frames 46 consist of an integer number of eight-bit bytes, this matches a byte format commonly used with deinterleavers and Reed-Solomon decoders. Whenever an inversion state estimation error occurs in PTCM decoder 34, an integer number of eight-bit bytes will be in error. This configuration leads to efficiency in using Reed-Solomon encoding because such encoding techniques declare an entire byte in error if any bit contained in the byte is found to be in error. Accordingly, such errors are concentrated in a manner which maximizes the usefulness of Reed-Solomon encoding.

In summary, the present invention provides an improved system and method for communicating digital data while resolving phase ambiguities. A PTCM encoder and decoder are provided which are rotationally invariant. The PTCM encoder and decoder implement a pragmatic trellis coded modulation scheme without differentially encoding the secondary modulation. A pilot bit is used instead. In addition, the PTCM encoder and decoder operate at a variety of effective code rates while remaining rotationally invariant.

The present invention has been described above with reference to preferred embodiments. However, those skilled in the art will recognize that changes and modifications may be made in these preferred embodiments without departing from the scope of the present invention. For example, while the present invention has been described in connection with a specific process flow in connection with FIG. 6, those skilled in the art will appreciate that this process flow may be implemented using a variety of hardware and/or software architectures. While the exemplary embodiment described herein is a desirable one, those skilled in the art will appreciate that the coding rate for the secondary stream and the overall effective coding rate may be set at any desired value by appropriate dimensioning of frame size and puncturing. These and other changes and modifications which are obvious to those skilled in the art are intended to be included within the scope of the present invention.

What is claimed is:

1. An apparatus for encoding information bits to be communicated so that phase ambiguities are resolvable, said encoding apparatus comprising:

a differential encoder configured to produce a first encoded stream in response to a first stream portion of said information bits;

a pilot bit generator configured to produce an augmented second stream in response to a second stream portion of said information bits, said augmented second stream including a pilot bit of predetermined polarity periodically inserted into said second stream portion of said information bits;

a convolutional encoder configured to produce a second encoded stream in response to said augmented second stream; and a phase mapper configured to generate phase point data in response to said first and second encoded streams.

2. An encoding apparatus as claimed in claim 1 wherein:

said convolutional encoder produces two symbols for each bit in said augmented second stream; and said convolutional encoder couples to said phase mapper so that only one of said two symbols are mapped per unit interval.

3. An encoding apparatus as claimed in claim 1 wherein:

said first and second encoded data streams together provide k symbols per unit interval; and said phase mapper is configured so that all symbols of a first polarity in said second encoded stream are mapped to a phase of approximately $(2n+1)(2\pi/2^k)$, and all symbols of a second polarity in said second encoded stream are mapped to a phase of approximately $(2n)(2\pi/2_k)$, where n is an integer in the range of 0 to $2^{k-1}-1$.

4. A method of encoding information bits for digital communication so that phase ambiguities are resolvable, said encoding method comprising the steps of:

a) partitioning an information bit stream into a first stream and a second stream;

b) differentially encoding said first stream to produce a first encoded stream;

c) periodically inserting a pilot bit of predetermined polarity into said second stream;

d) encoding said second stream, including said periodically inserted pilot bit, according to a second coding format to produce a second encoded stream; and e) concurrently phase mapping said first and second encoded streams.

5. An encoding method as claimed in claim 4 wherein:

said step d) has a coding rate of $\leq\frac{1}{2}$ so that at least two symbols of said second encoded stream are produced for each bit in said second stream, including said periodically inserted pilot bit; and said method additionally comprises the step of puncturing said second encoded stream so that said coding rate is raised to a value $<\frac{2}{3}$.

6. An encoding method as claimed in claim 4 wherein:

said step d) has a coding rate of $\leq\frac{1}{2}$ so that at least two symbols of said second encoded stream are produced for each bit in said second stream, including said periodically inserted pilot bit; and said method additionally comprises the step of puncturing said second encoded stream so that one of the at least two symbols produced for each of said pilot bits is erased.

7. An encoding method as claimed in claim 4 wherein said step d) implements a ½ rate, transparent, convolutional encoder.

8. An encoding method as claimed in claim 4 wherein said first stream includes at least 2 bits per unit interval and said second stream, including said periodically inserted pilot bit, includes less than 1 bit per unit interval.

9. An encoding method as claimed in claim 4 wherein:

said first and second encoded data streams together provide k symbols per unit interval; and said step e) is configured so that all symbols of a first polarity in said second encoded stream are mapped to a phase of approximately $(2n+1)(2\pi/2^k)$, and all symbols of a second polarity in said second encoded stream are mapped to a phase of approximately $(2n)(2\pi/2^k)$, where n is an integer in the range of 0 to $2^{k-1}-1$.

10. An encoding method as claimed in claim 4 wherein:

said step d) produces two symbols for each bit in said second stream; and said step e) maps only one of said two symbols per unit interval.

11. An apparatus for decoding information bits from a digital communication signal and resolving phase ambiguities, said decoding apparatus comprising:

a phase estimator configured to generate a stream of phase values in response to said digital communication signal;

a convolutional decoder configured to decode said stream of phase values to generate a second data stream, said second data stream including a portion of said information bits and a periodically occurring pilot bit;

a controller configured to identify occurrences of said periodically occurring pilot bit in said second data stream;

a phase rotator configured to generate an adjusted phase value stream by selectively rotating said stream of phase values in response to said periodically occurring pilot bit and said portion of said information bits; and a differential decoder configured to differentially decode said adjusted phase value stream into a first data stream, said first data stream and said portion of said information bits together providing said information bits.

12. A decoding apparatus as claimed in claim 11 wherein:

said apparatus additionally comprises a convolutional encoder coupled to said convolutional decoder, said convolutional encoder being configured to produce a re-encoded data stream; and said phase rotator is responsive to said re-encoded data stream.

13. A decoding apparatus as claimed in claim 11 additionally comprising a depuncture circuit coupled to said phase estimator and said controller, said depuncture circuit being configured to periodically insert erasure values into said stream of phase values, said erasure values being inserted adjacent to occurrences of phase values which directly correspond to said pilot bit.

14. A decoding apparatus as claimed in claim 11 wherein said phase rotator selectively rotates said phase values by either zero or a predetermined phase value depending upon said periodically occurring pilot bit and said portion of said information bits.

15. A method of decoding information bits from a digital communication signal and resolving phase ambiguities, said decoding method comprising the steps of:

a) generating a stream of phase values in response to said digital communication signal;

b) decoding said stream of phase values to generate a second data stream, said second data stream including a portion of said information bits and a periodically occurring pilot bit;

c) identifying said periodically occurring pilot bit in said second data stream;

d) selectively adjusting said stream of phase values in response to said periodically occurring pilot bit and said portion of said information bits to produce an adjusted phase value stream; and e) differentially decoding said adjusted phase value stream to generate a first data stream, said first data stream and said portion of said information bits together providing said information bits.

16. A decoding method as claimed in claim 15 additionally comprising the step of removing said periodically occurring pilot bit from said second data stream.

17. A decoding method as claimed in claim 15 wherein said step b) implements a convolutional decoder.

18. A decoding method as claimed in claim 17 wherein:

said method additionally comprises the step of encoding said second data stream to produce a re-encoded data stream; and said step d) is responsive to said re-encoded data stream.

19. A decoding method as claimed in claim 15 wherein:

said method additionally comprises the step of depuncturing said stream of phase values to produce a depunctured stream of phase values; and said step b) is responsive to said depunctured stream of phase values.

20. A decoding method as claimed in claim 19 wherein said depuncturing step is responsive to said step c) so that an erasure value is inserted into said depunctured stream of phase values at positions which are adjacent to occurrences of phase values which directly correspond to said pilot bit.

21. A decoding method as claimed in claim 15 wherein said step d) selectively rotates each of said phase values by either zero or a predetermined phase value depending upon said periodically occurring pilot bit and said portion of said information bits.

22. A decoding method as claimed in claim 15 wherein:

said digital communication signal conveys k symbols per unit interval, where k is an integer; and said step d) selectively rotates each of said phase values by either zero or $(2\pi/2^k)$ depending upon said periodically occurring pilot bit and said portion of said information bits.

23. A decoding method as claimed in claim 15 wherein:

said digital communication signal is configured so that symbols of a first polarity in said second data stream are mapped to a phase of approximately $(2n+1)(2\pi/2^k)$, and symbols of a second polarity in said second data stream are mapped to a phase of approximately $(2n)(2\pi/2^k)$, where n is an integer in the range of 0 to $2^{k-1}-1$;

said step d) rotates said stream of phase values by approximately $(2\pi/2^k)$ when corresponding symbols from said second data stream exhibit said first polarity and said periodically occurring pilot bit indicates no inversion; and said step d) rotates said stream of phase values by approximately zero when corresponding symbols from said second data stream exhibit said second polarity and said periodically occurring pilot bit indicates no inversion.

24. A decoding method as claimed in claim 23 wherein:

said step d) rotates said first data stream by approximately zero when corresponding symbols from said second data stream exhibit said first polarity and said periodically occurring pilot bit indicates an inversion; and said step d) rotates said first data stream by approximately $(2\pi/2^k)$ when corresponding symbols from said second data stream exhibit said second polarity and said periodically occurring pilot bit indicates an inversion.

25. A decoding method as claimed in claim 23 additionally comprising the step of delaying said first data stream to provide coincidence between symbols of said first data stream and symbols of said second data stream.

* * * * *